3,288,783
AZIRIDINYL ANTHRAQUINONE PIGMENTS
Roy A. Pizzarello, Mount Vernon, N.Y., and Alfred F. Schneid and John J. De Lucia, New Milford, N.J., assignors to Interchemical Corporation, New York, N.Y., a corporation of Ohio
No Drawing. Filed Apr. 15, 1964, Ser. No. 360,057
3 Claims. (Cl. 260—239)

This invention relates to aziridinyl anthraquinone pigments. More particularly it relates to water-insoluble colored organic anthraquinone pigments containing certain aziridine groups capable of reacting with textile fibers and with certain reactive polymers and thus enhancing the fastness properties of the textiles so colored.

This application is a continuation-in-part of our prior and copending applications Serial No. 62,837, filed October 17, 1960; Serial No. 62,856, filed October 17, 1960; and Serial No. 62,873, filed October 17, 1960, and now abandoned.

Reactive dyestuffs are already known. They are colored compounds containing atoms or groups of atoms capable of reacting with fibers. Generally they are water soluble and are used mainly on cellulosic fibers, although application to silk, wool, and nylon have been mentioned. The unreacted dyestuff should preferably have little affinity for the fibers so that the surplus can be washed away. Alkali is required when the reaction splits off acid, for example when the reactive atom is chlorine. Compounds containing triazine radicals with chlorine or bromine attached directly to a triazine ring or to a pyrimidyl radical form one class of commercially available reactive dyestuffs. Others contain the radicals beta-halogenopropionyl, beta-halogenoethylsulfonyl, chloroacetylamino, alkyl phosphite, beta-hydroxy-ethylsulfonyl, beta-(chloromethyl) - beta - sulfatoethylsulfonyl and sulfone fluoride.

Our new water-insoluble colored organic pigments containing the aziridine ring react with textile fibers, especially cellulosic ones, and with certain reactive groups present in polymeric materials. We synthesized a number of such pigments by attaching aziridinyl groups to dyestuff molecules through linking groups. The desired activity of the pigments is due to opening of the aziridinyl rings. When the ring opens a carbonium or an amide ion is formed and these ions are capable of reacting with other imines to form polymers or with other groups to form addition compounds. Through the ring-opening reaction the new colorants can be made to react with fibers and also with polymeric materials containing certain reactive groups such as COOH, CONH$_2$, OH, NH$_2$ etc Examples of the pigments of this invention are water-insoluble colored organic anthraquinone pigments represented by the formulas (A)

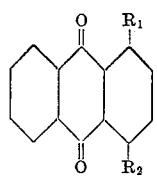

wherein R$_1$ is selected from the group consisting of

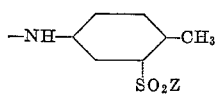

—NHCOCH$_2$CH$_2$Z, and —COZ; R$_2$ is selected from the group consisting of —NHCOZ,

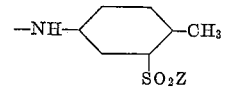

H, —OH, —NHCOCH$_2$CH$_2$Z, and —COZ; and Z is

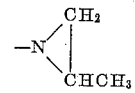

and (B) a water-insoluble colored organic anthraquinone pigment having the formula

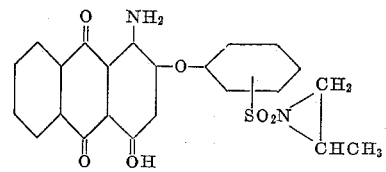

It will be understood that the practice of this invention is not limited to the embodiments specifically shown herein as illustrations, but on the contrary that many more compounds fall within the scope of the invention as disclosed.

The pigments may be applied to textiles by printing and padding, the finished materials having enhanced resistance to laundering and drycleaning. If the printing paste contains a resin that reacts with the imine group, such as a carboxyl-containing butadiene/acrylonitrile latex, the finished textile will be even more wash resistant. The imine groups probably react with the textile fibers as well as with reactable resins or thickeners. Even in the absence of a binder the pigments can be fixed to the fibers, although a binder improves the print with respect to fastness and depth of shade.

*Example 1*

1,200 ml. of benzene, 200 ml. dimethyl formamide, and 44.6 g. 1-aminoanthraquinone were stirred together and heated to 40° C. 11.5 g. triethylamine were added and then over a period of 15 minutes a solution of 9.0 g. acrylyl chloride in 30 ml. benzene. The temperature rose from 40° C. up to 45° C. The batch was stirred 2 hours at 45° C., heated to reflux, held there for 3 hours, cooled, and filtered. To the filtrate were added 500 ml. water and enough HCl to give an acid reaction with Congo red. After the benzene was distilled off, the material was filtered hot, and washed with 8 liters of hot water followed by petroleum ether. The compound was first air dried and then oven dried. 48.5 g. of a red powder were obtained. It had a melting point of 166–167° C. and contained 5.07% N. 1-acrylamidoanthraquinone should contain 5.09% N. A mixture of 20 g. of this compound, 350 ml. acetone, and 50 ml. dimethyl formamide was stirred ½ hour at room temperature to dissolve. To this was added a solution of 6.1 g. propylenimine in 30 ml. acetone. The batch was stirred 1 hour and then heated at reflux temperature for 3 hours, cooled and filtered. The filtrate was drowned in 2 liters of water at 25° C. and stirred ½ hour. The mixture was filtered, washed with water followed by petroleum ether, and dried. 25.1 g. of a red powder were obtained having a melting point of 147–155° C.

*Example 2*

1,200 ml. benzene, 200 ml. dimethyl formamide, and 47.6 g. 1-amino-4-hydroxyanthraquinone were stirred and heated to 40° C. 23.0 g. triethylamine were added at once. The batch was stirred 15 minutes and then 18 g. acrylyl chloride in 60 ml. benzene were added, the temperature rising from 33° to 40° C., the stirring was continued 2 hours at 40° to 45° C. and then 3 hours more at reflux temperature. The batch was filtered after cooling. To the filtrate were added 500 ml. water and enough HCl to give an acid reaction with Congo red. After the benzene was all distilled off, the residue was filtered hot, washed with hot water followed by petroleum ether. 44.4 g. of a red powder were obtained having a melting point of 143°–145° C. and a nitrogen content of 4.06%. The theoretical percentage of nitrogen is 4.78%. 20 g. of the 1-acryloamido-4-hydroxyanthraquinone so prepared together with 350 ml. acetone and 50 ml. dimethyl formamide were stirred at room temperature for ½ hour and then 6.1 g. propylenimine in 30 ml. acetone were added over a ½ hour period. The mixture was stirred one hour at room temperature and then heated at reflux temperature for 3 hours. It was filtered cold after standing overnight. The filtrate was drowned in 2 liters of water, stirred ½ hour, filtered, and washed well with water followed by petroleum ether. 12.5 g. of a red powder having a melting point of 147°–155° C. were recovered.

Example 3

600 ml. benzene, 100 ml. dimethyl formamide and 23.8 g. of 1,4-diaminoanthraquinone were stirred and heated to 40° C. 23 g. of triethylamine were added at once. The batch was stirred 15 minutes and over a ½-hour period 18 g. acrylyl chloride in 60 ml. benzene were added, the temperature rising from 33 to 45° C. It was stirred 2 hours at 40° to 45° C. and then heated to reflux for 3 hours. After standing overnight the batch was filtered. To the filtrate were added 500 ml. water and enough HCl to give an acid reaction with Congo red. At reflux temperature the benzene was removed by steam distillation. The residue was filtered hot, washed well with water followed by petroleum ether, and oven-dried overnight. 25.5 g. of a violet powder were obtained having a melting point of 142°–148° C. 20 g. of this 1,4-bis(acryloamido)anthraquinone, 350 ml. acetone, and 50 ml. dimethyl formamide were stirred to solution at room temperature. 12.2 g. propylenimine in 60 ml. acetone were added over a ½-hour period, the batch stirred an additional hour at room temperature and then 3 hours more at reflux temperature. It was filtered cold after standing overnight, the residue washed with petroleum ether, and dried. The filtrate was drowned in 1 liter of cold water after most of the acetone had been distilled off under vacuum. The pigment was salted out but the resulting particle size was so small it was impossible to filter. Upon heating, however, 10.8 g. of a deep violet powder were recovered by filtering and washing the heated mixture.

Example 4

30 g. phosgene were added over a period of 2 hours below the surface of 300 ml. dry monochlorobenzene, the temperature being kept at —7° C. 48 g. of 1-amino-4-hydroxyanthraquinone was then added over a five-minute period and the cooling bath removed. The addition of phosgene was continued, the temperature was allowed to rise to 40° C. and held there 3 hours. The batch was allowed to stand overnight. In the morning it was heated at 100° C., the addition of phosgene continuing until not more HCl was evolved (5 hours). The mass was cooled to 30° C. and nitrogen bubbled through for 2 hours. The batch was again allowed to stand overnight, then it was filtered at 25° C., washed with monochlorobenzene followed by petroleum ether, and air dried. 44.0 g. of a yellow powder were obtained which had a melting point above 400° C. (1-amino-4-hydroxyanthraquinone melts at 200–203° C.). 23.9 g. of this product (1 - isocyano - 4 - hydroxyanthraquinone) were dissolved in 150 ml. dimethyl formamide and to this were added, over a period of 15 minutes, a solution of 8.6 g. propylenimine in 15 ml. dimethyl formamide, the temperature rising from 27 to 37° C. It was then heated to 55° C. for 3 hours, drowned in 2 liters of cold water, stirred ½ hour, filtered, washed with water followed by petroleum ether, and dried. 24.0 g. of a yellow-red powder were obtained which had a melting point over 200° C. The product was

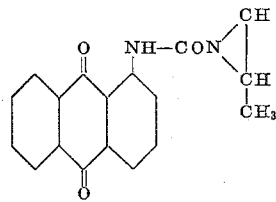

Example 5

The intermediate, 1,4-diamino-(4,4'-dimethyl-3,3'-benzene disulfonye chloride) anthraquinone, was prepared as follows. 200 g. of 1,4 - diamino - (4,4' - dimethylphenyl) anthraquinone were added to 1000 g. of chlorosulfonic acid while maintaining the mixture at a temperature below 40° C. After the addition was complete, the temperature was slowly raised to 60° C. and held there one hour. Then it was raised to 110° C., held for three and a half hours, and cooled to 25° C. 240 ml. of thionyl chloride was added and the batch was heated up to 80° C., maintained at that point for one hour, cooled to 30° C., and drowned in six liters of ice and water. The product was then filtered off and washed with water until free of acid. 11 g. sodium carbonate and 6.2 g. propylenimine were dissolved in 200 ml. water and heated to 45° C. While stirring, 31 g. of the intermediate, prepared as described above, were added over a half-hour period. The mixture was maintained at 45° to 50° C. for two hours, then filtered, washed until free of alkali, and dried. A green powder was obtained consisting essentially of 1,4 - diamino - (4,4' - dimethyl-3,3'-disulfomethyl aziridinyl imido phenyl) anthraquinone. Yield was 30.5 g.

What is claimed is:

1. A water-insoluble colored organic anthraquinone pigment selected from the group consisting of
   (A) a water-insoluble colored organic anthraquinone pigment having the formula

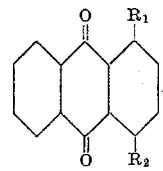

where $R_1$ is selected from the group consisting of

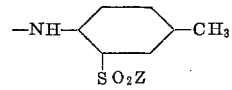

—$NHCOCH_2CH_2Z$, and —$COZ$; $R_2$ is selected from the group consisting of

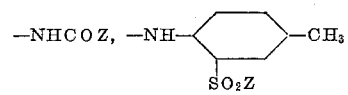

H, OH, —$NHCOCH_2CH_2Z$, and —$COZ$; and Z is

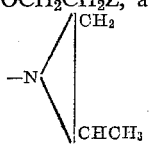

and (B) a water-insoluble colored organic anthraquinone pigment having the formula
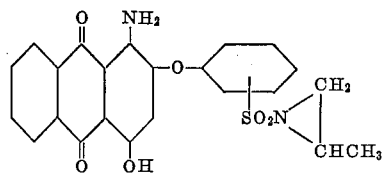
2. A water-insoluble organic anthraquinone pigment as defined under (A) in claim 1.
3. A water-insoluble colored organic anthraquinone pigment as defined under (B) in claim 1.
No references cited.
ALEX MAZEL, *Primary Examiner.*
A. D. ROLLINS, *Assistant Examiner.*

UNITED STATES PATENT OFFICE
CERTIFICATE OF CORRECTION

Patent No. 3,288,783  November 29, 1966

Roy A. Pizzarello et al.

It is hereby certified that error appears in the above numbered patent requiring correction and that the said Letters Patent should read as corrected below.

Column 4, line 22, for "disulfonye" read -- disulfonyl --; lines 58 to 61 and lines 65 to 69, the formulas, each occurrence should appear as shown below instead of as in the patent:

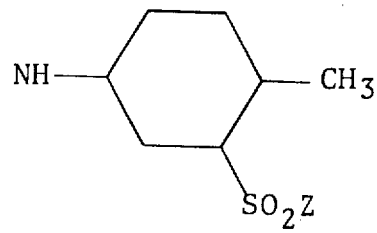

Signed and sealed this 12th day of September 1967.

(SEAL)
Attest:

ERNEST W. SWIDER
Attesting Officer

EDWARD J. BRENNER
Commissioner of Patents